United States Patent [19]

Synosky et al.

[11] Patent Number: 5,175,009

[45] Date of Patent: Dec. 29, 1992

[54] STABILIZED CHEWING GUM CONTAINING ACIDIFIED HUMECTANT

[75] Inventors: Steven P. Synosky, Green Brook; Charles P. Orfan, Howell; John W. Foster, Piscataway, all of N.J.

[73] Assignee: Wm. Wrigley Jr. Company, Chicago, Ill.

[21] Appl. No.: 778,579

[22] Filed: Oct. 17, 1991

[51] Int. Cl.⁵ .............................................. A23G 3/30
[52] U.S. Cl. ........................................ 426/3; 426/658
[58] Field of Search .......................................... 426/3-6, 426/658, 804, 548

[56] References Cited

U.S. PATENT DOCUMENTS

| | | | |
|---|---|---|---|
| 3,716,374 | 2/1973 | Pitchon | 99/78 |
| 3,868,472 | 2/1975 | Berg et al. | 426/342 |
| 3,922,369 | 11/1975 | Glicksman et al. | 426/548 |
| 3,928,633 | 12/1975 | Shoaf et al. | 426/96 |
| 3,956,507 | 5/1976 | Shoaf et al. | 426/96 |
| 4,004,039 | 1/1977 | Shoaf et al. | 426/548 |
| 4,064,274 | 12/1977 | Mackay et al. | 426/3 |
| 4,065,579 | 12/1977 | MacKay et al. | 426/3 |
| 4,085,227 | 4/1978 | Mackay et al. | 426/3 |
| 4,087,557 | 5/1978 | Bakal et al. | 426/3 |
| 4,088,788 | 5/1978 | Ream et al. | 426/3 |
| 4,122,195 | 10/1978 | Bahoshy et al. | 426/3 |
| 4,166,134 | 8/1979 | Witzel et al. | 426/3 |
| 4,246,286 | 1/1981 | Klose et al. | 426/3 |
| 4,252,830 | 2/1981 | Kehoe et al. | 426/5 |
| 4,517,379 | 5/1985 | Brennan et al. | 564/193 |
| 4,554,167 | 11/1985 | Sorge et al. | 426/285 |
| 4,556,565 | 12/1985 | Arima et al. | 426/3 |
| 4,656,039 | 4/1987 | Weiss et al. | 426/5 |
| 4,673,577 | 6/1987 | Patel | 426/5 |
| 4,714,619 | 12/1987 | Seltzman et al. | 426/548 |
| 4,722,845 | 2/1988 | Cherukuri et al. | 426/5 |
| 4,753,806 | 6/1988 | Carroll et al. | 426/3 |
| 4,774,094 | 9/1988 | Carroll et al. | 426/3 |
| 4,780,324 | 10/1988 | Knebl et al. | 426/3 |
| 4,792,453 | 12/1988 | Reed et al. | 426/5 |
| 4,800,095 | 1/1989 | Carroll et al. | 426/548 |
| 4,804,543 | 2/1989 | Dokuzovic et al. | 426/3 |
| 4,822,621 | 4/1989 | Glass et al. | 426/5 |
| 4,822,622 | 4/1989 | Dokuzovic et al. | 426/5 |
| 4,824,681 | 4/1989 | Schoebel et al. | 426/5 |
| 4,828,857 | 5/1989 | Sharma et al. | 426/285 |
| 4,839,184 | 6/1989 | Cherukuri et al. | 426/307 |
| 4,929,447 | 5/1990 | Yang | 424/440 |
| 4,938,963 | 7/1990 | Parnell | 424/440 |

FOREIGN PATENT DOCUMENTS

| | | |
|---|---|---|
| 0027024 | 4/1981 | European Pat. Off. . |
| 0272220 | 6/1988 | European Pat. Off. . |
| 0302023 | 7/1988 | European Pat. Off. . |
| 0287957 | 10/1988 | European Pat. Off. . |
| 0302024 | 2/1989 | European Pat. Off. . |
| 58-193655 | 11/1983 | Japan . |
| 58-198250 | 11/1983 | Japan . |
| 62-25014 | 6/1987 | Japan . |

*Primary Examiner*—Jeanette Hunter
*Attorney, Agent, or Firm*—Willian Brinks Olds Hofer Gilson & Lione

[57] ABSTRACT

Aspartame in chewing gum is stabilized by acidifying the humectant which is then added to the chewing gum. Enough food acid is added to the humectant to cause the pH of the humectant to remain between about 3.0-5.0, in order to create the most stable environment for the aspartame. Because the acidified humectant is dispersed substantially uniformly throughout the chewing gum, aspartame located anywhere in the gum is stabilized.

31 Claims, 1 Drawing Sheet

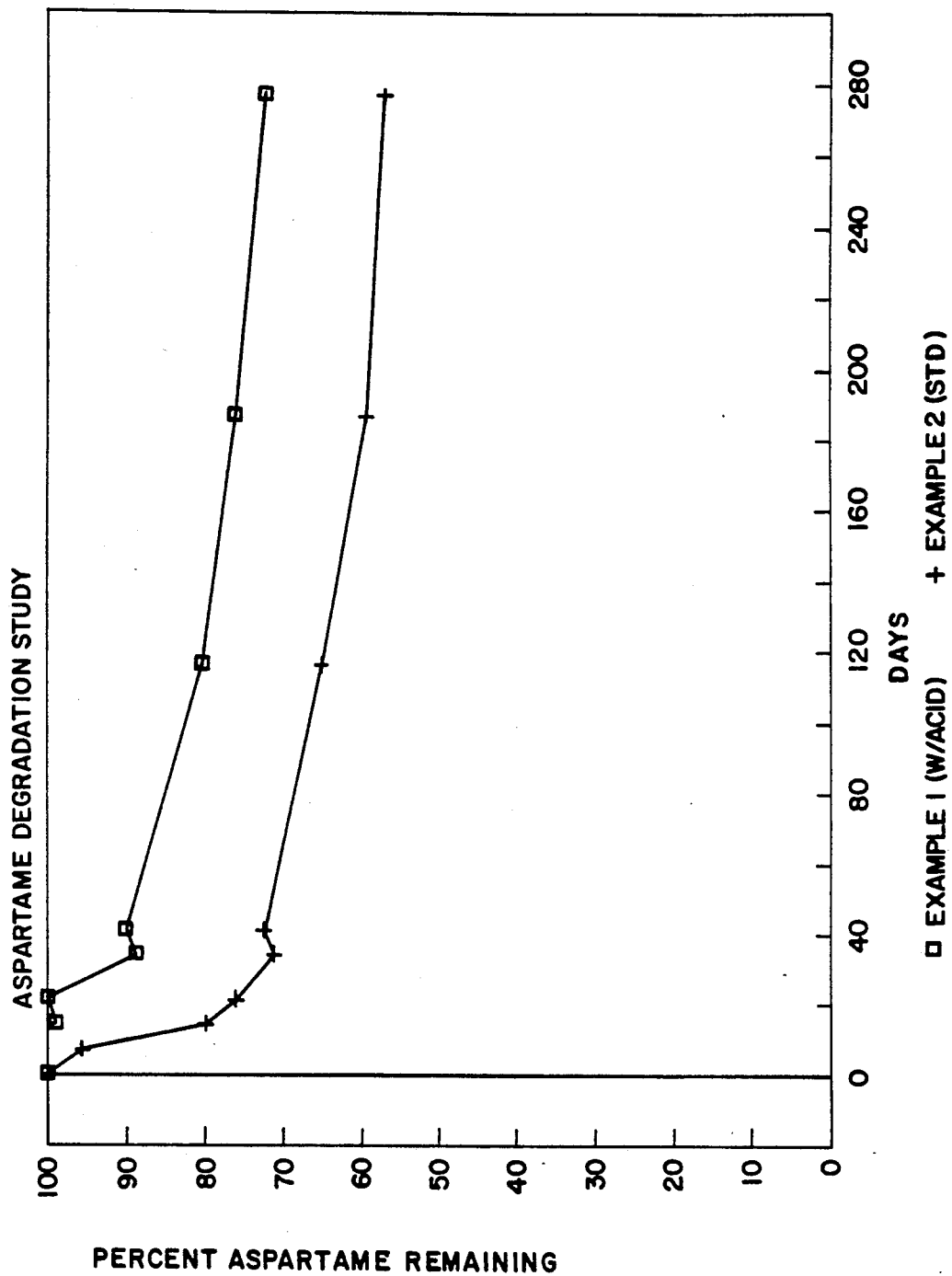

STABILIZED CHEWING GUM CONTAINING ACIDIFIED HUMECTANT

FIELD OF THE INVENTION

The present invention relates to a method of stabilizing aspartame (APM), when aspartame is used in chewing gum. The invention also relates to a stabilized chewing gum which contains aspartame.

BACKGROUND OF THE INVENTION

It is well known that aspartame (APM) sweetened chewing gum products are susceptible to decomposition and/or reaction of the APM under certain conditions, causing loss of sweetness and undesirable off-flavors. The conditions that contribute to the decomposition and/or reaction of APM include, but are not limited to, exposure to heat or moisture, a neutral or alkaline pH, and the presence of aldehyde-containing flavoring agents. Under these conditions, APM can hydrolyze to the dipeptide aspartylphenylanaline (AP), or decompose to diketopiperazine (DKP), or react with aldehydes. AP and DKP can decompose further over time to their individual amino acid components.

AP and DKP, and their decomposition products, are not sweet and impart undesirable flavors to chewing gum. Therefore, it is necessary to control the decomposition of APM. Since APM cannot tolerate high temperatures for extended periods of time, the production of chewing gum containing APM must be accomplished relatively quickly and using as low a temperature as possible, with the APM added late in the mixing process during the driest part of the mixing cycle. Generally, APM has relatively good stability at a pH between about and 5, with optimal stability occurring at about pH 4.0-4.3. However, some chewing components, especially gum bases containing calcium carbonate filler, typically cause chewing gum to have pH's above that range.

Methods have been employed to attempt to stabilize APM, thus reducing its decomposition and reactivity in a chewing gum environment. For instance, Glass et al. U.S. Pat. No. 4,822,621 discloses a technique in which the APM and the flavoring agent are initially blended into two separate gum portions, which are then coextruded together. Prior to chewing of the gum, the contact between the APM and the flavoring agent is generally limited to the interface between the coextruded portions.

Shoaf et al. U.S. Pat. Nos. 3,298,633 and 3,956,507, disclose a technique in which the APM is dispersed in a hot melt and the hot melt is cooled, thereby encapsulating the APM. Examples of hot melt ingredients include anhydrous and hydrous citric acid. Other fusing agents include monosaccharides, polysaccharides and other materials. These references deal only with food and beverage applications.

Demaso et al. European Application 0 134 322 discloses that a low pH, preferably in the range of 2-3, is the most desirable for APM stability. The reference deals only with a process for incorporating APM into extruded food products including cereals and baked goods.

Klose et al. U.S. Pat. No. 4,246,286 discloses the stabilization of APM in a chewing gum composition, by adjusting the chewing gum pH to between 5.0 and 7.0. This is accomplished by eliminating calcium carbonate filler from the gum. Also, citric acid or another non-toxic organic acid is employed as an acidifying agent.

Japanese Publication Sho 61-212255 discloses a sweetener composition containing APM, fructose and small amounts of organic acid and organic acid salts. The organic acid is selected from citric acid, tartaric acid, malic acid, fumaric acid and adipic acid.

U.S. Pat. No. 4,087,557, issued to Bakal et al., discloses the entrapping of artificial sweeteners other than APM in an ester gum, in order to reduce or delay the initial sweetness impact of the artificial sweetener.

U.S. Pat. No. 4,556,565, issued to Arima et al., discloses that APM in a chewing gum containing calcium carbonate does not have good long term stability because the APM is rapidly decomposed by the calcium carbonate. The reference discloses a chewing gum in which the calcium carbonate in the base is replaced with microcrystalline cellulose powder.

U.S. Pat. No. 4,064,274, issued to Mackay, discloses the use of a non-basic filler such as magnesium silicate. A fruit acid is added to the gum to bring the pH to below 4.0.

U.S. Pat. No. 4,122,195, issued to Bahoshy et al., and U.S. Pat. No. 4,139,639, issued to Bahoshy. disclose the encapsulation of APM to improve its stability.

U.S. Pat. No. 4,085,277, issued to Mackay et al., discloses a chewing gum in which a finely divided sweetening agent and a finely divided food acid are dispersed in the gum base portion thereof.

U.S. Pat. Nos. 3,928,633, 3,956,507 and 4,004,039, issued to Shoaf et al., disclose the encapsulation of APM by melting a fuseable mass and subdividing it to encapsulate the APM therein. Citric acid monohydrate, citric acid, and other food acids are employed as diffusing media.

U.S. Pat. No. 3,868,472, issued to Berg et al., discloses the co-grinding of APM with an acid, in the presence of an organic solvent in which the APM is insoluble.

U.S. Pat. No. 4,792,453, issued to Reed et al., discloses a sugarless hard coated chewing gum having a chewing gum center prepared by mixing calcium carbonate, glycerine, and an aqueous sorbitol solution, and later adding an encapsulated high intensity sweetener.

U.S. Pat. Nos. 4,774,094 and 4,753,806, issued to Carroll et al., discloses the stabilization of APM by cooking the APM in aqueous hydrogenated starch hydrolysate or, optionally, glycerine.

European Patent Application 0 272 220 and U.S. Pat. No. 4,824,681 disclose the encapsulation of APM in a coating material comprising a hydrophobic polymer and a hydrophobic plasticizer. An acidifying agent can be included in the coating material to extend the shelf life of the APM.

Japan Patent Disclosure Nos. Sho 83.198250, Sho 83-193655 and Sho 87.25014 all disclose the dispersion and encapsulation of APM in hydrogenated starch hydrolysates and/or hydrogenated maltose syrup. In the '250 reference, microcrystalline cellulose powder is used instead of calcium carbonate or talc. In the '655 reference, a combination of sodium citrate and citric, malic or tartaric acid is also used in the encapsulating agent in order to maintain a pH of [4.3 ± 1.0. In the '014 reference, vegetable gum is also included in the sweetener ingredient. In all of these three references, the ingredients are first dissolved and mixed in water, and then dried and powdered.

U.S. Pat. No. 4,673,577, issued to Patel, discloses the use in chewing gum of APM which has been encapsulated with a food grade shellac.

U.S. Pat. No. 3,922,369, issued to Glicksman et al., discloses the co-drying of solutions of an edible organic acid and APM.

European Patent Application 0 302 024 discloses chewing gum having APM in a first portion, and aldehyde flavoring agent in a second portion and a barrier film in between the first and second portions. European Patent Application 0 302 023 discloses a similar chewing gum except that the first portion may also contain an organic acid to help stabilize the APM.

Thus, it is known from the prior art that APM is more stable in an acid environment. The most common approach has been to place the acid in the immediate vicinity of the APM, to place and maintain the APM and acid in a dry form, and to encapsulate or otherwise isolate the APM from the humectant (i.e. moisture containing ingredients) of the chewing gum. However, because the humectant is generally required to be distributed substantially uniformly throughout the chewing gum, it is difficult to maintain this isolation of the APM while at the same time providing an even distribution of sweetness. Also, the pH in the vicinity of the APM is rather difficult to control and maintain uniformly with the range of 3.0-5.0 when the acid is concentrated in the vicinity of the APM and is not homogeneously distributed throughout the chewing gum.

SUMMARY OF THE INVENTION

The present invention involves the stabilization or further stabilization of APM by acidifying the humectant prior to its addition into the chewing gum. Enough acid is added to the humectant such that the pH of the humectant is maintained substantially uniformly at between about 3.0 and about 5.0. Since most or all of the moisture in the finished chewing gum is provided by the humectant, this pH environment is maintained when this acidified humectant is blended into the chewing gum.

APM which is exposed to the humectant will not readily decompose or react because the pH of the chewing gum will place the APM in its most stable, least reactive condition. Even APM which is not exposed to the humectant (e.g. due to encapsulation) will be further stabilized because the pH in the vicinity of the APM will be more likely to stay within the range of 3.0-5.0, consistent with the overall chewing gum environment.

Food acids, for example malic acid, citric acid, tartaric acid, adipic acid and/or fumaric acid can be used to acidify the humectant. The food acid is initially dissolved in water, preferably distilled water, preferably at a 1:1 weight ratio of acid and water. The acid solution is then blended with the humectant component of the chewing gum in a quantity sufficient to cause the pH of the humectant to fall between about 3.0-5.0. The acidified humectant is then combined with the other chewing gum components during gum processing.

If the chewing gum will be substantially free of components such as calcium carbonate which react with food acid, then the pH of the acidified humectant can initially be adjusted to about 3.0-5.0, and will not change significantly after the acidified humectant is combined with the other chewing gum components. Therefore, it is preferred that the chewing gum be substantially free of calcium carbonate.

With the foregoing in mind, it is a feature and advantage of the invention to provide an improved method for stabilizing APM in a chewing gum environment, by acidifying the humectant portion of the chewing gum.

It is also a feature and advantage of the invention to provide an improved APM-containing chewing gum composition, in which the APM is stabilized by acidification of the humectant portion of the chewing gum.

These and other features and advantages will become further apparent from the following detailed description of the presently preferred embodiments when read in conjunction with the accompanying figure. It should be understood that this description is illustrative rather than limitative, the scope of the invention being defined by the appended claims and equivalents thereof.

BRIEF DESCRIPTION OF THE FIGURE

FIG. 1 shows the percentage of APM remaining in chewing gum as a function of time, for a chewing gum sample containing acidified humectant and for a standard chewing gum sample. FIG. 1 illustrates the results of experimental work described in Examples 1 and 2.

DETAILED DESCRIPTION OF THE PRESENTLY PREFERRED EMBODIMENTS

The present invention involves acidifying the humectant in the chewing gum in order to stabilize APM which is located anywhere in the gum. The advantage of acidifying the humectant is that the acid can be more thoroughly dispersed throughout the gum matrix because the humectant itself is thoroughly dispersed. The solubilized acid is added to the humectant, and the humectant is an effective way to introduce the acid.

The term "humectant" refers to the moisture containing ingredients present in chewing gum. These ingredients include, but are not necessarily limited to, one or more of the following: glycerine, aqueous sorbitol solution, hydrogenated corn syrups, hydrogenated starch hydrolysates, and mixtures thereof. Some common commercially available humectants include Lycasin ® 80/55 (hydrogenated corn syrup) available from the Roquette Corp. of New York, N.Y.; hydrogenated starch hydrolysates available from Lonza, Inc. of Fairlawn, N.J; and 70% sorbitol solution available from Pfizer, Inc. of New York, N.Y. Of these, the 70% sorbitol solution is most preferred for use with the invention.

Food acids such as malic acid, citric acid, tartaric acid, adipic acid, fumaric acid or combinations of the foregoing can be used to acidify the humectant. Of these, malic acid is the most preferred due to its high water solubility and low tartness.

Preferably, the chewing gum will be substantially free of calcium carbonate or another reactive filler and will instead utilize an inert filler such as talc. If the chewing gum is substantially free of calcium carbonate or another reactive component, then the humectant need only be acidified to a pH of between about 3.0-5.0 before the humectant is combined with the other chewing gum ingredients, in order to provide chewing gum with approximately the same pH. Preferably, the humectant is acidified to a pH of between about 3.5-4.5. Most preferably, the humectant is acidified to a pH of between about 4.0-4.3 in order to achieve optimum stability of the APM.

Chewing gums of the invention should generally contain acidified humectants in an amount of between about 10 and about 25 weight per cent of the chewing gum. Preferably, the chewing gum contains between about 10 and about 20 weight per cent acidified humectant. Most preferably, the chewing gum contains between about 12 and about 17 weight per cent acidified humectant. The term "acidified humectant" refers to the total of the original commercially available humectant plus the aqueous acid solution that is combined with the humectant to effect acidification of the humectant.

In order to acidify the humectant, a quantity of food acid should first be dissolved in water, preferably distilled water, and preferably in an amount of about one part by weight food acid per one part by weight water. The solution should be thoroughly mixed either manually or mechanically, preferably using a Waring blender or a planetary mixer. A sufficient quantity of the acid solution is then added to the humectant to achieve a pH within the desired range. The pH can be measured using any conventional means, including standard litmus or pH meter techniques.

Chewing gum compositions typically comprise a generally water soluble bulk portion, a water insoluble chewing gum base portion and typically water insoluble flavoring agents. The water soluble portion dissipates with a portion of the flavoring agent over a period of time during chewing. The gum base portion is retained in the mouth throughout the chewing process.

The insoluble gum base generally comprises elastomers, elastomer plasticizers, waxes, fats, oils, softeners, emulsifiers, fillers, texturizers and miscellaneous ingredients such as antioxidants, preservatives, colorants and whiteners. The gum base constitutes about 5-95% by weight of the chewing gum composition, more typically 10-50% by weight of the chewing gum, and most commonly 20-35% by weight of the chewing gum.

Elastomers constitute about 5 to about 95 percent by weight of the base, preferably between 10 and 70 per cent by weight and most preferably between 15 and 45 percent by weight. Elastomers may include synthetic elastomers such as polyisobutylene, polybutadiene, isobutylene-isoprene copolymer, styrenebutadiene copolymer, polyvinylacetate, vinyl acetate-vinyl laurate copolymer, polyethylene, ethylene vinyl acetate, polyvinyl alcohol or mixtures thereof. Natural elastomers may also include natural rubber such as smoked or liquid latex and guayule as well as natural gums such as jelutong, lechi caspi, perillo, massaranduba balata, massaranduba chocolate, nispero, rosindinha, chicle, gutta hang kang or mixtures thereof. Elastomers provide the rubbery, cohesive nature to the gum which varies depending on the elastomer's chemical and physical properties, and how the elastomer is blended with other ingredients.

Elastomer plasticizers modify the finished gum firmness when used in the gum base. Elastomer plasticizers constitute from about 0 to about 75 percent by weight of the gum base, preferably 5 to 45 per cent by weight and most preferably 10 to 30 per cent by weight. Elastomer plasticizers include natural rosin esters such as glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, methyl and partially hydrogenated methyl esters of rosin, pentaerythritol ester of rosin, or mixtures thereof. Elastomer plasticizers also include synthetics such as terpene resins derived from alphapinene, beta-pinene and/or d-limonene.

Waxes include synthetic (e.g. polyethylene and Fischer-Tropsch waxes) and natural (candelilla carnauba, beeswax, rice bran or mixtures thereof) and petroleum (e.g. microcrystalline and paraffin). Waxes, when used, generally constitute up to about 30 weight percent of the gum base. Waxes aid in the curing of finished gum made from the gum base and also help improve the release of flavor, increase the shelf life and improve the chewing texture.

Fillers modify the texture of the gum base and aid processing. Fillers/texturizers include magnesium and calcium carbonate, ground limestone and silicate types such as magnesium and aluminum silicate, clay, alumina, talc as well as titanium oxide, mono-, di- and tricalcium phosphate, cellulose polymers such as ethyl, methyl and wood or mixtures thereof. The filler comprises about 1 to about 60 percent by weight of the gum base. The preferred gum base for the present invention is one that contains a filler that is inert to acids, most preferably talc.

Softeners modify the texture and cause the hydrophobic and hydrophilic components of the gum base and chewing gum to become more miscible. Softeners/emulsifiers include tallow, hydrogenated tallow, lard, hydrogenated and partially hydrogenated vegetable oils, cocoa butter, glycerol monostearate, glycerol triacetate, lecithin, mono-, di- and triglycerides, acetylated mono-, di- and triglycerides, distilled mono., di- and triglycerides, and fatty acids (e.g. stearic, palmitic, oleic, linoleic and linolenic acids) or mixtures thereof. Softeners/emulsifiers generally constitute about 0.5 to about 40 weight per cent of the gum base.

Antioxidants prolong shelf life and storage of the gum base, finished gum and/or their respective components include fat and flavor oils. Antioxidants may include butylated hydroxyanisole (BHA), butylated hydroxytoluene (BHT), beta-carotenes, tocopherols, acidulants such as Vitamin C, propyl gallate or mixtures thereof.

Colorants and whiteners impart desired color characteristics or remove undesired color by whitening of the base and/or chewing gum. Colorants and whiteners include FD & C type lakes, plant extracts, fruit and vegetable extracts, titanium dioxide or mixtures thereof.

The gum base is typically prepared by blending the elastomer, elastomer plasticizers, filler, softeners, etc. until a completely homogeneous mass is attained. This can usually be achieved in one to four hours, depending on the formulation. The completed molten mass is emptied from the mixing kettle to be used for the production of chewing gum.

The generally water-soluble portion of the chewing gum may comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners include, but are not limited to, glycerin, lecithin, and mixtures thereof. Further, aqueous sweetener solutions such as those containing sorbitol, hydrogenated starch hydrolysates, corn syrup and combinations thereof may be used as softeners and binding agents in gum.

Bulk sweeteners constitute about 20.80% by weight of the chewing gum, preferably about 30-60% by weight of the chewing gum, and may include both sugar and sugarless sweeteners and components. Sugarless sweeteners are preferred for use with the present invention. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be used concomitantly with aspartame in the present invention. These may include but are not limited to sucralose, salts of acesulfame, alitame, saccharin and its salts, cyclamic acid and its salts, dihydrochalcones, thaumatin, monellin, and the like, alone or in combination. The present invention contemplates the use of aspartame in an amount of about 0.1 to about 1.0 weight percent of the chewing gum.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

One or more flavoring agents may be present in the chewing gum in an amount within the range of about 0.1 to about 10.0 percent and preferably from about 0.5 to about 5.0 weight percent of the gum. The flavoring agents may comprise essential oils, natural or synthetic flavors or mixtures thereof including but not limited to oils derived from plants and fruits such as citrus oils, fruit essences, peppermint oil, spearmint oil, other mint oils, clove oil, oil of wintergreen, anise, and the like. Artificial flavoring agents and components are also contemplated. Those skilled int he art will recognize that natural and artificial flavoring agents may be combined in any sensorially acceptable fashion. All such flavors and flavor blends are contemplated by the present invention.

Optional ingredients such as colors, emulsifiers and pharmaceutical agents may also be added to the chewing gum.

In general, chewing gum is manufactured by sequentially adding the various chewing gum ingredients to a commercially available mixer known in the art. After the ingredients have been thoroughly mixed, the gum mass is discharged form the mixer and shaped into the desired form such as by rolling into sheets and cutting into sticks, extruding into chunks, or casting into pellets.

Generally, the ingredients are mixed by first softening (e.g. with heat) the gum base and adding it to the running mixer. The base may also be softened in the mixer itself. Color or emulsifiers may also be added at this time. The acidified humectant can then be added intermittently along with portions of the bulking agent. Further portions of the bulking agent may then be added to the mixer. The APM is then added after the acidified humectant has been thoroughly blended into the gum ass. A flavoring agent is typically added with the final portion of the bulking agent.

The gum mass is removed form the mixer and can be extruded, rolled, sheeted and processed into the desired shape and size. The entire mixing procedure typically takes from twenty to thirty minutes, but longer mixing times may sometimes be required. Those skilled in the art will recognize that variations of the above described procedure, or different procedures, may be followed.

A wide range of changes and modifications to the embodiments of the invention described above will be apparent to persons skilled in the art. The following examples are not to be construed as imposing limitations on the invention, but are included merely to illustrate preferred embodiments.

EXAMPLES 1 AND 2

Chewing gum samples were prepared according to the following formulae. The only difference between the samples was that, for Example 1, the humectant ingredient (70% sorbitol solution) was acidified prior to being added to the chewing gum formulation, using aqueous malic acid. The acidification was effected by mixing the humectant and acid solution in a Waring blender for a period of one minute at room temperature, using a mixing speed of 100 rpm.

| Chewing Gum Component | Per Cent By Weight | |
| --- | --- | --- |
| | Example 1 | Example 2 |
| Paloja ® T | 30.00 | 30.00 |
| Acidified 70% Sorbitol Solution (pH = 4.3) | 15.05* | — |
| Non-Acidified 70% Sorbitol Solution | — | 15.00 |
| Mannitol Powder | 17.45 | 17.50 |
| Sorbitol Powder | 31.00 | 31.00 |
| 99% Glycerine | 5.00 | 5.00 |
| APM | 0.25 | 0.25 |
| Peppermint Oil | 1.25 | 1.25 |
| Total | 100.00 | 100.00 |

*The acidified sorbitol solution contained 15.00 parts by weight of the 70% sorbitol solution acidified with a mixture of .025 parts by weight malic acid and .025 parts by weight distilled water.

The chewing gum samples were prepared using a one liter Sigma blade mixer at a mixing temperature from about 30° C. to about 50° C. The mixer was set at speeds of 50 rpm for the fast blade and 25 rpm for the slow blade. For each sample, all the base, one third of the bulking agent and one quarter of the humectant were initially added to the mixer and were mixed for 5 minutes. Then, an additional one quarter of the humectant was added to the mixer, and mixed with the initial components for an additional 5 minutes. Then, an additional one third of the bulking agent was added to the mixer and was mixed for another 5 minutes. Then, the remaining bulking agent and acidified humectant were added and were mixed for another 4 minutes. The remaining ingredients were added and mixed during the next 11 minutes. The total mix time was 30 minutes for each chewing gum sample. The chewing gum mixtures were rolled and scored into 0.075 inch thick chewing gum sticks. The chewing gum sticks were placed in standard white chewing gum sample boxes.

Next, the boxed chewing gum sticks for Examples 1 and 2 were stored at room temperature and ambient humidity for a period of 280 days. For each of Examples 1 and 2, 100 sticks were stored in the sample boxes. Selected chewing gum sticks were evaluated for the percent APM remaining at various time intervals. The evaluation for APM was made using a liquid chromatograph equipped with a $C_{18}$ column and a UV detector set at 257 nm.

The results of this experiment are shown in FIG. 1. As shown in FIG. 1, the sample not containing acidified humectant experienced much greater reduction in percent APM remaining, as the sample containing acidified humectant, during the 280-day period. For the sample containing acidified humectant (Example 1), the reduction in remaining APM did not begin until after twenty days had passed. For the sample not containing acidified humectant (Example 2), the reduction in APM began immediately.

These results indicate that by acidifying the humectant used in the chewing gum, the onset of the reaction and/or decomposition of APM in the chewing gum can be significantly delayed and, thereafter, the extent of the reaction and/or decomposition can be significantly reduced.

While the embodiments of the invention disclosed herein are at present considered to be preferred, various modifications and improvements can be made without departing from the spirit and scope of the invention. The scope of the invention is indicated in the appended claims, and all changes that come within the meaning and range of equivalency of the claims are intended to be embraced therein.

We claim:

1. A method of preparing a chewing gum composition which comprises a water-soluble bulk portion, a chewing gum base portion, one or more flavoring agents and aspartame, comprising the steps of:
    dissolving a quantity of food acid in water to form an aqueous food acid solution;
    mixing enough aqueous food acid solution with humectant to form an acidified humectant solution having a pH below 5.0; and
    mixing the acidified humectant solution with the other chewing gum ingredients until the acidified humectant solution becomes thoroughly dispersed throughout the chewing gum composition.

2. The method of claim 1 wherein the chewing gum is substantially free of calcium carbonate, comprising the step of mixing enough aqueous food acid solution with humectant to form an acidified humectant solution having a pH of between about 3.0 and below 5.0.

3. The method of claim 2 wherein enough aqueous food acid solution is mixed with the humectant to form an acidified humectant solution have a pH between about 3.5 and about 4.5.

4. The method of claim 2 wherein enough aqueous food acid solution is mixed with the humectant to form an acidified humectant solution have a pH between about 4.0 and about 4.3.

5. The method of claim 1 comprising the step of mixing enough aqueous food acid solution with the humectant that the chewing gum has a pH between about 3.0 and below 5.0.

6. The method of claim 5 wherein enough aqueous food acid solution is mixed with the humectant that the chewing gum has a pH between about 3.5 and about 4.5.

7. The method of claim 5 wherein enough aqueous food acid solution is mixed with the humectant that the chewing gum has a pH between about 4.0 and about 4.3.

8. The method of claim 1 wherein the food acid comprises an acid selected from the group consisting of malic acid, citric acid, tartaric acid, adipic acid, fumaric acid and combinations thereof.

9. The method of claim 8 wherein the food acid comprises malic acid.

10. The method of claim 1 wherein the humectant comprises a moisture-containing ingredient selected from the group consisting of glycerin, aqueous sorbitol solution, hydrogenated corn syrups, hydrogenated starch hydrolysates, and combinations thereof.

11. The method of claim 10 wherein the humectant comprises an aqueous sorbitol solution.

12. The method of claim 11 wherein the aqueous sorbitol solution comprises about 70 weight percent sorbitol.

13. A chewing gum produced according to the method of claim 1.

14. A chewing gum, comprising:
    a water soluble bulk portion;
    a chewing gum base portion;
    one or more flavoring agents;
    aspartame; and
    an acidified humectant solution containing a mixture of humectant and an aqueous food acid solution, and having a pH of about 3.0 to below 5.0;
    wherein the acidified humectant solution is thoroughly dispersed throughout the chewing gum composition.

15. The chewing gum of claim 14 wherein the water soluble bulk portion comprises a bulk sweetener in an amount of between 20.80 weight percent of the chewing gum.

16. The chewing gum of claim 15 wherein the bulk sweetener constitutes between 30-60 weight percent of the chewing gum.

17. The chewing gum of claim 15 wherein the bulk sweetener comprises a sugarless sweetener selected from the group consisting of sorbitol, mannitol, xylitol, hydrogenated starch hydrolysates, maltitol and combinations thereof.

18. The chewing gum of claim 14 wherein the chewing gum base portion comprises a synthetic elastomer selected from the group consisting of polyisobutylene, polybutadiene, isobutylene-isoprene copolymer, styrene-butadiene copolymer, polyvinyl acetate, vinyl acetate-vinyl laurate copolymer, polyethylene, ethylene vinyl acetate, polyvinyl alcohol, and combinations thereof.

19. The chewing gum of claim 14 wherein the chewing gum base portion comprises a natural elastomer selected from the group consisting of natural rubber, natural gums, and combinations thereof.

20. The chewing gum of claim 14 wherein the chewing gum base portion comprise an inert filler.

21. The chewing gum of claim 20 wherein the inert filler comprises talc.

22. The chewing gum of claim 14 wherein the bulk portion comprises the aspartame, in an amount of about 0.1 to about 1.0 weight percent of the chewing gum.

23. The chewing gum of claim 14 wherein the acidified humectant solution constitutes about 10 to about 25 weight percent of the chewing gum.

24. The chewing gum of claim 14 wherein the acidified humectant solution constitutes about 10 to about 20 weight percent of the chewing gum.

25. The chewing gum of claim 14 wherein the acidified humectant solution constitutes about 12 to about 17 weight percent of the chewing gum.

26. The chewing gum of claim 14 wherein the acidified humectant solution has a pH of about 3.5 to about 4.5.

27. The chewing gum of claim 14 wherein the acidified humectant solution has a pH of about 4.0 to about 4.3.

28. The chewing gum of claim 14 wherein the humectant comprises a moisture-containing ingredient selected from the group consisting of glycerin, aqueous sorbitol solution, hydrogenated corn syrups, hydrogenated starch hydrolysates, and combinations thereof.

29. The chewing gum of claim 28 wherein the humectant comprises an aqueous sorbitol solution.

30. The chewing gum of claim 14 wherein the food acid comprises an acid selected from the group consisting of malic acid, citric acid, tartaric acid, adipic acid, fumaric acid and combinations thereof.

31. The chewing gum of claim 30 wherein the food acid comprises malic acid.

* * * * *

UNITED STATES PATENT AND TRADEMARK OFFICE
CERTIFICATE OF CORRECTION

PATENT NO. : 5,175,009
DATED : December 29, 1992
INVENTOR(S) : Steven P. Synosky et al.

Page 1 of 2

It is certified that error appears in the above-identified patent and that said Letters Patent is hereby corrected as shown below:

Column 1, line 36, after "about" please insert --3--.

Column 2, line 25, after "Bahoshy" delete "." and insert --,--.

Column 2, line 64, before "4.3" please delete "[".

Column 6, line 28, please delete "mono.," and substitute therefore --mono-,--.

Column 6, line 65, please delete "20.80%" and substitute therefore --20-80%--.

Column 7, line 33, delete "int he" and substitute --in the--.

Column 7, line 45, delete "form" and substitute --from--.

Column 7, line 57, please delete "ass" and substitute --mass--.

Column 7, line 59, delete "form" and substitute --from--.

UNITED STATES PATENT AND TRADEMARK OFFICE
CERTIFICATE OF CORRECTION

PATENT NO. : 5,175,009

DATED : December 29, 1992

INVENTOR(S) : Steven P. Synosky et al.

It is certified that error appears in the above-identified patent and that said Letters Patent is hereby corrected as shown below:

Column 9:
    Claim 3, line 3, delete "have" and substitute --having--.
    Claim 4, line 3, delete "have" and substitute --having--.
Column 10:
    Claim 15, line 3, delete "20.80" and substitute --20-80--, Signed and Sealed this Thirtieth Day of August, 1994

Attest:

BRUCE LEHMAN

Attesting Officer     Commissioner of Patents and Trademarks